US009807495B2

(12) United States Patent
Hodges et al.

(10) Patent No.: US 9,807,495 B2
(45) Date of Patent: Oct. 31, 2017

(54) WEARABLE AUDIO ACCESSORIES FOR COMPUTING DEVICES

(71) Applicant: Microsoft Technology Licensing, LLC, Redmond, WA (US)

(72) Inventors: Stephen E Hodges, Cambridge (GB); John Helmes, Tegelen (NL); Matthai Philipose, Seattle, WA (US); Nissanka Arachchige Bodhi Priyantha, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 324 days.

(21) Appl. No.: 13/775,627

(22) Filed: Feb. 25, 2013

(65) Prior Publication Data

US 2014/0241540 A1   Aug. 28, 2014

(51) Int. Cl.
*H04R 1/10* (2006.01)
*H04M 1/60* (2006.01)
*G06F 3/16* (2006.01)

(52) U.S. Cl.
CPC ........ *H04R 1/1091* (2013.01); *H04M 1/6066* (2013.01); *G06F 3/167* (2013.01); *H04M 2250/12* (2013.01); *H04M 2250/74* (2013.01)

(58) Field of Classification Search
CPC .............. H04R 1/1091; H04M 1/6066; H04M 2250/74; H04M 2250/12; G06F 3/167
See application file for complete search history.

(56) References Cited

U.S. PATENT DOCUMENTS

| 8,270,637 | B2 | 9/2012 | Abolfathi |
| 8,289,162 | B2 | 10/2012 | Mooring et al. |
| 2003/0161097 | A1* | 8/2003 | Le et al. ........................ 361/683 |
| 2005/0009583 | A1* | 1/2005 | Cheung et al. ............ 455/575.6 |
| 2006/0068851 | A1* | 3/2006 | Ashman, Jr. .................. 455/566 |
| 2006/0183514 | A1* | 8/2006 | Patton ................. B60R 11/0247 455/575.2 |
| 2006/0195324 | A1* | 8/2006 | Birk et al. .................... 704/275 |

(Continued)

OTHER PUBLICATIONS

Roy, et al., "Wearable Audio Computing: A Survey of Interaction Techniques", In Technical Report, MIT Media Lab, , Apr. 1997, 9 pages.

(Continued)

*Primary Examiner* — Ping Lee

(57) ABSTRACT

Wearable audio accessories for computing devices are described. In one embodiment the wearable audio accessory provides a speech based interface between the user and a nearby computing device for the performance of user-initiated or computing device initiated microtasks. Information is provided to the user via a loudspeaker and the user can provide input via a microphone. An audio sensing channel within the accessory continuously monitors the audio signal as detected by the microphone and in various embodiments will trigger more complex audio processing based on this monitoring. A wireless communication link is provided between the accessory and the nearby computing device. To mitigate any delay caused by the switching between audio processing techniques, the audio accessory may include a rolling buffer which continuously stores the audio signal and outputs a delayed audio signal to the audio processing engines.

20 Claims, 10 Drawing Sheets

(56) References Cited

U.S. PATENT DOCUMENTS

| | | |
|---|---|---|
| 2007/0149246 A1 | 6/2007 | Bodley et al. |
| 2007/0263125 A1* | 11/2007 | Ootsuki .............. G02B 27/017 348/571 |
| 2007/0281744 A1* | 12/2007 | Andreasson ................. 455/557 |
| 2009/0051649 A1 | 2/2009 | Rondel |
| 2010/0041447 A1 | 2/2010 | Graylin |
| 2010/0150368 A1* | 6/2010 | Chang et al. ................ 381/71.6 |
| 2010/0312724 A1* | 12/2010 | Pinckney ............ G06N 99/005 706/11 |
| 2010/0330908 A1* | 12/2010 | Maddern et al. ............ 455/41.2 |
| 2011/0014957 A1* | 1/2011 | Sugimori et al. .......... 455/569.1 |
| 2011/0288860 A1 | 11/2011 | Schevciw et al. |

OTHER PUBLICATIONS

Fradrich, et al., "Siri vs. Windows Speech Recognition", In TJ Interactive: Translation Journal Blog, vol. 16, Issue 3, Jul. 2012, 14 pages.
Sawhney, et al., "Nomadic Radio: Scaleable and Contextual Notification for Wearable Audio Messaging", in Journal: ACM Transactions on Computer-human Interaction—TOCHI , vol. 7, No. 3, pp. 353-383, 2000.
Sawhney, et al., "Speaking and Listening on the Run: Design for Wearable Audio Computing", in Proceedings of ISWC'98, International Symposium on Wearable Computing, Oct. 1998, 8 pages.

\* cited by examiner

WEARABLE AUDIO ACCESSORIES FOR COMPUTING DEVICES

BACKGROUND

Existing audio accessories for smartphones are used to listen to music or to make phone calls and can be divided into two types: wired and Bluetooth™. The wired headsets connect to the 3.5 mm headphone jack or a proprietary connector and comprise ear buds which contain small speakers and may also include a microphone (often located part way along the wires from the ear buds to the connector) for use when making a phone call. The Bluetooth™ versions may be wearable headsets (which typically attach to the user's ear) or may be designed for in car use (e.g. to clip to a sun visor). The wearable headsets may provide ear buds or an alternative form factor to provide a small speaker in or close to the ear canal or may conduct sound to the inner ear through the bones of the skull, whilst the in car versions typically include a speaker. Both the wearable Bluetooth™ headsets and in car devices typically comprise a microphone for detecting speech when making a phone call.

The embodiments described below are not limited to implementations which solve any or all of the disadvantages of known audio accessories for smartphones.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Wearable audio accessories for computing devices are described. In one embodiment the wearable audio accessory provides a speech based interface between the user and a nearby computing device for the performance of user-initiated or computing device initiated microtasks. Information is provided to the user via a loudspeaker and the user can provide input via a microphone. An audio sensing channel within the accessory continuously monitors the audio signal as detected by the microphone and in various embodiments will trigger more complex audio processing based on this monitoring. A wireless communication link is provided between the accessory and the nearby computing device. To mitigate any delay caused by the switching between audio processing techniques, the audio accessory may include a rolling buffer which continuously stores the audio signal and outputs a delayed audio signal to the audio processing engines.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Existing audio accessories for smartphones enable users to listen to music or have phone conversations without needing to hold the smartphones to their heads. This makes it easier to do such activities whilst on the move (e.g. walking, jogging, etc); however these accessories do not provide access to data (e.g. data stored on the smartphone).

Although the present examples are described and illustrated herein as being implemented as an accessory for a smartphone, the methods and apparatus described is provided as an example and not a limitation. As those skilled in the art will appreciate, the present examples are suitable for application in conjunction with a variety of different types of computing devices which may be portable (e.g. laptops, tablet computers, portable games consoles, etc) or fixed (e.g. desktop computers, non-portable games consoles, internet enabled televisions or set-top boxes, etc).

Figure 1:
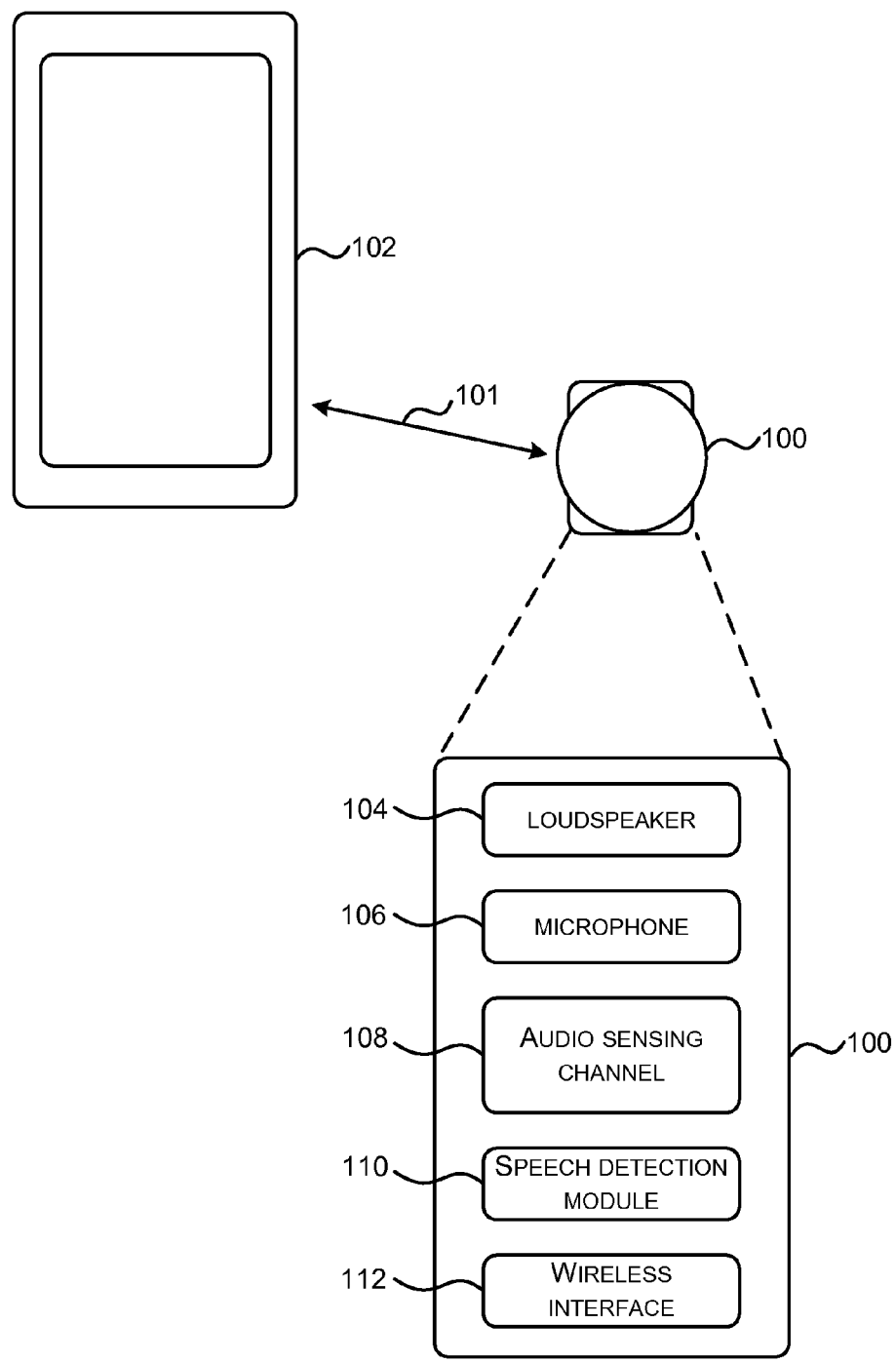
FIG. 1 is a schematic diagram of an example audio accessory.

FIG. 1 is a schematic diagram of an audio accessory which is a wearable speech interface device for a smartphone or other computing device. The wearable speech interface device 100, provides a wearable hands-free, eye-free device with a speech based interface between the wearable speech interface device 100 and the user (who may also be referred to as the wearer) and a communication link 101 between the wearable speech interface device 100 and the host device 102 (i.e. the smartphone or other computing device). The wearable speech interface device 100 may therefore be described as providing a speech based interface between the user and the host device 102.

The term 'hands-free' is used herein to refer to the fact that the wearable speech interface device is not held in a user's hand. The wearable speech interface device may still comprise buttons and/or touch sensors, as described below. The term 'eye-free' is used herein to refer to the fact that the wearable speech interface device does not obscure the vision of a user (e.g. it is not mounted in front of a user's eye).

The speech based interface may be used both for user-initiated actions such as querying the host device (e.g. querying for information stored in the calendar or for information available on the interne via a search engine application) and host device initiated actions such as providing notifications to the user (e.g. of upcoming appointments in their calendar, email or text messages received, etc). All these actions may be categorized as microtasks as they are short in duration and are discrete activities. Examples of user-initiated microtasks include checking in at a location (e.g. in a social media application), checking local traffic, checking stock prices, checking the time and making a note to self (i.e. a personal note for the user). The interactions between the user and the host device (via the wearable speech interface device) are not reliant on the presence of any network connection (e.g. the host device 102 does not require network connectivity to enable the interactions) and although some microtasks may require network connectivity, many do not and this lack of reliance on network connectivity for the interaction provides the user with confidence that they can rely on the interaction working.

The notifications/alerts provided by the wearable speech interface device (in host device initiated microtasks) may be more reliable and/or more informative than existing host device based notification methods such as displaying a pop-up on screen (which requires the user to be looking at the host device), sending a text message to the user's smartphone (which requires the user to check their smartphone and relies upon there being network connectivity) and beeping or playing a ring tone (where the user has to correctly interpret the meaning of the beep/ring tone). In some existing systems a user may pre-assign a sound or ring tone to a particular alert type (e.g. they may define a ring tone for calls from particular people and may define a different ring tone to indicate receipt of a text message rather than an email). However, these systems are not flexible and are all rely on a user setting up pre-defined notifications. In contrast, the notifications/alerts provided by the wearable speech interface device are flexible, can respond to changing circumstances and do not require pre-configuration by the user.

The wearable speech interface device may also be used for phone calls; however in various examples the design may be optimized for intermittent use (e.g. short bursts over an extended period such as 24 hours) and in some examples (described below), the wearable speech interface device may have two modes of operation, one for this intermittent use for microtasks and one for longer activities such as phone calls and listening to music.

The wearable speech interface device 100 is a small form factor device which is wearable and may therefore comprise a clip, tab or other attachment mechanism to allow a user to clip the device to their clothing (e.g. a lapel clip) or other object or hang it around their neck (e.g. like a necklace or scarf). Unlike existing audio accessories, the wearable speech interface device may also be designed to be head-free (i.e. a user does not wear it on their head, but it is instead attached to another part of their body or clothing). The wearable speech interface device 100 comprises a loudspeaker 104 and a microphone 106 and through use of both a directional loudspeaker and a directional microphone, privacy may be maintained (e.g. the loudspeaker is directed at the user and not others) and there is improved noise rejection and speaker (i.e. user) localization. For head-free versions of the wearable speech interface device, the directionality of the microphone improves performance because the microphone is further from the user's mouth and is consequently more susceptible to background noise. In some examples, the directional loudspeaker may comprise a multi-element speaker array and may use beam-forming techniques. Similarly, the directional microphone may be a multi-element microphone array. In the following description, the loudspeakers and microphones are not described as being directional; however it will be appreciated that directional loudspeakers and directional microphones may alternatively be used in any of the examples described herein.

The wearable speech interface device 100 further comprises an always-on, low power, audio sensing channel 108, a continuous speech (or conversation) detection module 110 and a wireless interface 112 which is arranged to enable wireless communication between the wearable speech interface device 100 and the host device 102. The wireless interface 112 may use Bluetooth™, Bluetooth Low Energy (BLE, also known as Bluetooth SMART), WiFi™ or other protocol.

The always-on, lower power, audio sensing channel 108 and the continuous speech detection module 110 work together to continuously monitor the audio signal detected via the microphone 106 while the audio sensing channel 108 and speech detection module 110 are operational and this can be described with reference to FIG. 2. In an example, the continuous speech detection module 110 continuously monitors the audio signal detected via the microphone 106 to detect the spoken word, where this may for example be a conversation with another person or a spoken command for the wearable speech interface device 100. The wearable speech interface device 100 uses a tiered approach to audio processing in order to detect context and the audio processing may be split between the wearable speech interface device itself, the host device and/or a remote device (e.g. a cloud-based service) in order to optimize both performance and power consumption.

Although the audio sensing channel 108 is described here as being always on, it will be appreciated that it is substantially always-on and will not operate if, for example, the feature or the audio processing is turned off as a result of the device being detached from an object (e.g. as described below with reference to FIG. 4) or if the wearable speech interface device 100 is powered down. Similarly, although the speech detection module 110 is described as being a continuous speech detection module, it will be appreciated that it will operate substantially continuously and will not operate if, for example, the feature or the audio processing is turned off as a result of the device being detached from an object (e.g. as described below with reference to FIG. 4) or if the wearable speech interface device 100 is powered down. Furthermore, the term 'continuously' as used herein may encompass a sampling process where the sampling period (e.g. of the audio signal detected via the microphone 106) is sufficiently short that it would not miss a spoken word.

Figure 2:
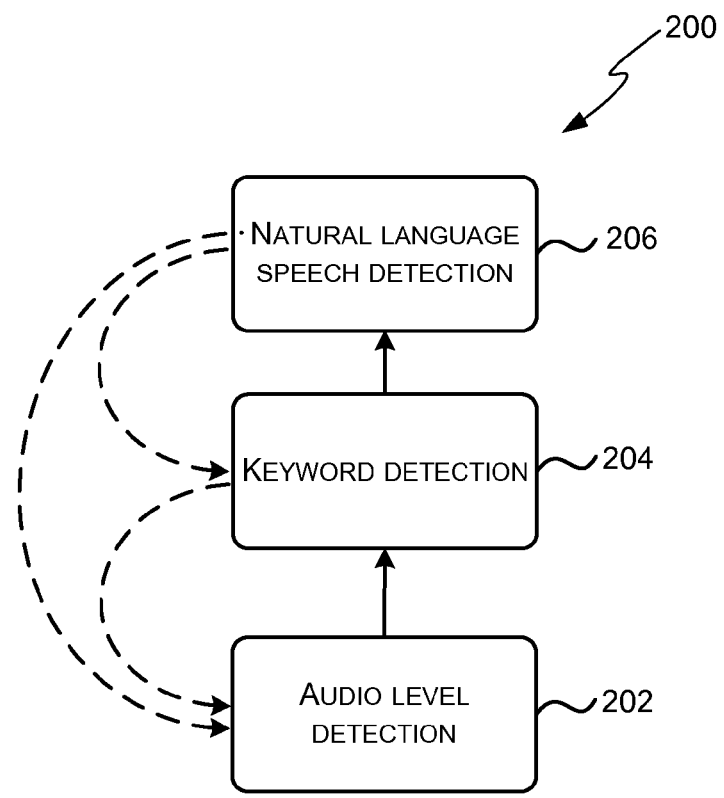
FIG. 2 is a schematic diagram of an example audio processing hierarchy.

FIG. 2 is a schematic diagram of an example audio processing hierarchy 200. In this example, at the lowest level, continuous audio level detection is performed (block 202), e.g. analog audio level detection which triggers the next level in the hierarchy when the detected level exceeds a threshold level. In some examples, the next level is only triggered when the presence of speech is additional detected (i.e. where the detected level exceeds the threshold and there is speech). The next level (block 204) is keyword detection which may be performed continuously from the point of trigger by the lower level. Detection of one or more predefined keywords in this level may in turn trigger activation of the next level (block 206) which uses natural language speech detection. The keywords used in the second level (block 204) may be user specific or generic or the user may be able to select between sets of predefined keywords when configuring the wearable speech interface device 100.

It will be appreciated that the audio processing system may subsequently return to a lower level in the audio processing hierarchy (e.g. upon detection of a period of silence or a period without detection of any speech which exceeds a threshold length). As indicated by the dotted arrows in FIG. 2, the system may move back through the hierarchy (e.g. from one level to the next level down) or may return straight to the lowest level (e.g. from block 206 to block 202). Although FIG. 2 shows three levels in the audio processing hierarchy, it will be appreciated that the hierarchy may comprise any number of levels.

In an example, the speech detection module 110 in the wearable speech interface device 100 may implement the first and/or second levels of the hierarchy 200 shown in FIG. 2 (where the module 110 implements the second level continuously, the first level may be omitted). The higher level(s) may then be implemented on the host device 102 and/or on a remote device (e.g. in the cloud) and in some examples may use a dedicated application/service or a pre-existing natural language user interface (or other audio processing technology) which is integrated within the operating system of the host device. In some examples, this split of audio processing across devices (wearable speech interface device/host device/remote device) may be fixed and in other examples the split may be controlled dynamically (e.g. under the control of the host device) in order to optimize performance and power consumption and this dynamic splitting may be based on one or more factors such as remaining battery power (of the wearable speech interface device and/or host device), processing power required and user history. In some examples, the split between devices may be different for different applications.

The tiered approach to audio processing described above provides one example of a power control technique which is used on the wearable speech interface device 100 in order to extend its battery life and, for example, to enable all-day always-on operation. The splitting of the audio processing between devices, so that not all levels are performed on the wearable speech interface device itself is a further example power control technique and other power control techniques may also be implemented, as described below. In another example of a power control techniques, different algorithms may be used within a particular level in the audio processing hierarchy (e.g. different keyword detection algorithms and/or different natural language speech detection algorithms) based on the amount of noise in the received audio signal. In this way, a less processor intensive algorithm may be used when the noise is low (and so speech detection is less difficult) and a more processor intensive algorithm may be used when the noise is higher.

The audio processing described above provides context information which may be used by the host device to determine when and/or how to communicate with the wearer via the wearable speech interface device (e.g. for host device initiated actions). For example, if the wearer is having a conversation with someone (as detected by the audio processing elements (e.g. audio sensing channel 108 and/or speech detection module 110), the host device 102 may delay providing a voice alert (e.g. to announce the arrival of a new email or text message) until there is a pause in conversation or until the conversation ends (e.g. as determined by a pre-defined length of time without any speech detected). In another example, where delaying providing the alert is less appropriate (e.g. an alarm or reminder of an imminent event), the type of alert may be selected to be less intrusive (e.g. a beep may be selected rather than a more detailed voice prompt). In other examples, the context information may be used to provide context dependent notifications (or prompts), e.g. in hot weather (e.g. as determined by a temperature sensor), a wearer may be notified when they are close to a water fountain or drinks machine so that they can re-hydrate.

In addition, the context information which is obtained using audio processing may be passed to applications running on the host device. In an example, the context information may be used to set a wearer's status in an instant messaging, VoIP (Voice over IP) or social media application. In other examples, the context information may be used by the host device in responding to user queries.

In addition to, or instead of, modifying the operation of the host device based on the context information, the operation of the wearable speech interface device may be modified based on the context information. For example, the volume of the loudspeaker 104 may be reduced if the wearer is speaking (and/or listening to another speaking). In another example, the volume of the loudspeaker 104 may be increased if there is a lot of background noise and/or the context information identifies that the wearer is outside.

In addition to the features shown in FIG. 2, a wearable speech interface device may comprise one or more additional elements and these are described below with reference to the examples shown in FIG. 3. It will be appreciated that although the examples in FIG. 3 show specific combinations of features, a wearable speech interface device may comprise any combination of the features shown and/or described herein.

Figure 3:
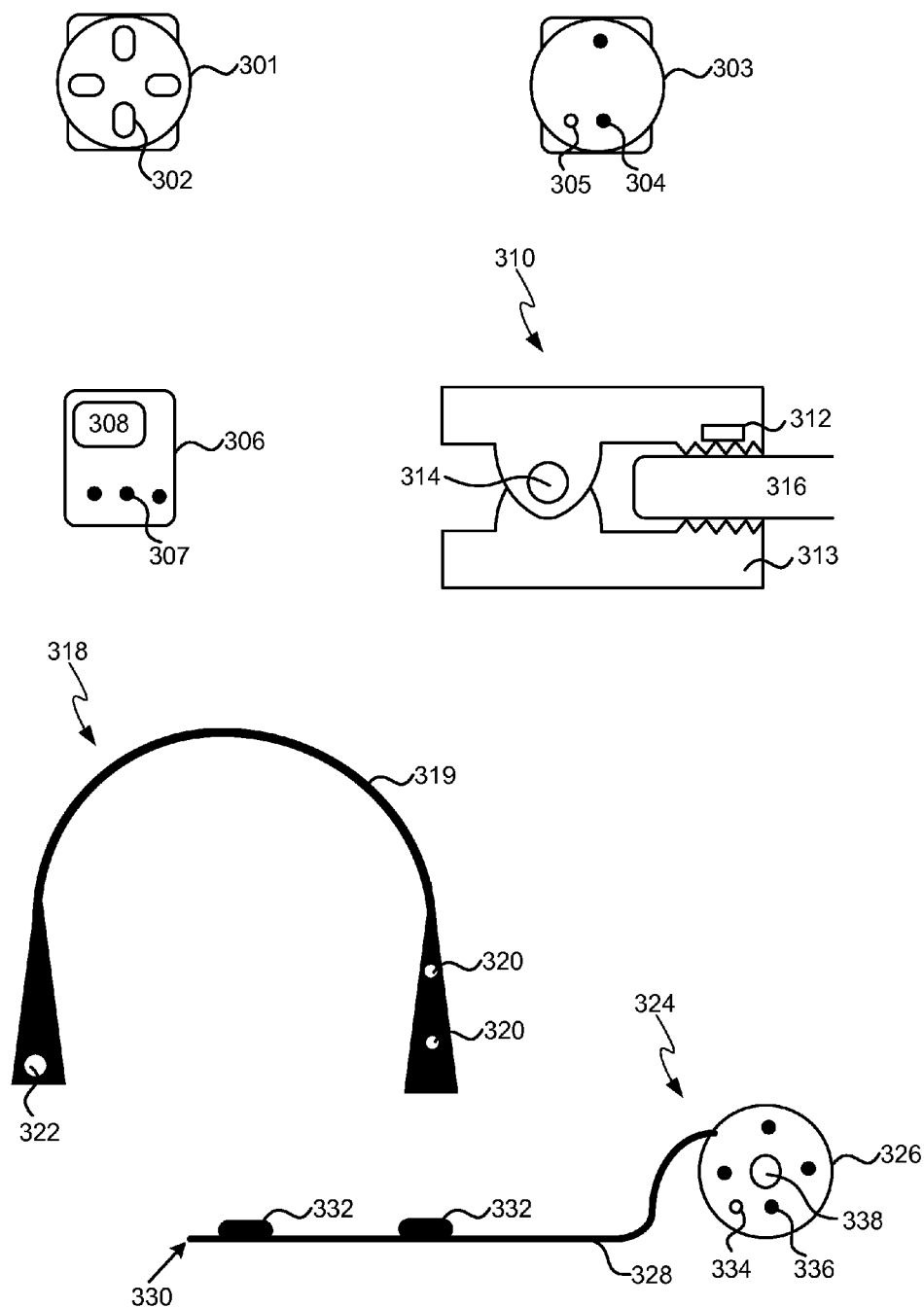
FIG. 3 shows schematic diagrams of various other example audio accessories.

The first example 301 in FIG. 3 comprises one or more physical controls 302. Each control may, for example, be a physical button, a touch sensing area or a proximity sensing area. These controls may be used to trigger the provision of additional information following a notification or host device initiated alert received by the wearer via the wearable speech interface device. For example, where the wearable speech interface device plays (via the loudspeaker) a short voice notification or alert sound, which may relate to a new message (e.g. email/text) that has been received or a calendar appointment, the wearer may touch a physical control and trigger a further, longer notification which may, for example, read out the new message (e.g. using a text to speech engine within the host device) or provide additional detail about the appointment (e.g. location, duration, etc). For user initiated actions, the controls may, for example, be used to trigger the repeating of a response provided by the host device (e.g. where the user did not hear it fully the first time the response was provided). The controls may also be used to configure the wearable speech interface device (e.g. to provide a volume control) or to disable operation or functionality of the wearable speech interface device (e.g. to prevent host device initiated microtasks during an important meeting or to place the wearable speech interface device into a 'silent' mode).

In a second example 303, the wearable speech interface device may comprise one or more sensors 304 (in addition to the microphone 106) to provide additional context information. Such sensors may, for example, enable the wearable speech interface device to detect if a user is inside/outside, stationary/moving, near another person, etc. Examples of sensors include, but are not limited to, an accelerometer, a gyroscope, a compass, a light level detector and a temperature sensor. Where these additional sensors are provided, the sensor data may be processed within the wearable speech interface device or alternatively there may be a data channel to the host device (e.g. using the wireless interface 112) and the sensor data may be processed on the host device or on a remote device (e.g. in the cloud). Where the wearable speech interface device comprises a touch sensor and a user can disable operation/functionality of the wearable speech interface device using this touch sensor (as described above), the additional context information may, for example, include whether the wearable speech interface device has been placed 'silent' mode or whether other functionality has been disabled.

In various examples, the wearable speech interface device may comprise a sensor 304 which is an IR (infra-red) detector and an IR source 305 (e.g. an IR LED) which may be arranged to detect other nearby wearable speech interface device devices. wearable speech interface device—wearable speech interface device context sensing may provide a more accurate determination that another person is close by compared to other techniques (e.g. based on audio processing) and the IR detector and source may, in some examples, be arranged to enable communication between wearable speech interface devices (rather than just presence detection), for example to identify a particular wearable speech interface device and/or a wearer of a wearable speech interface device.

The IR source 305 provides an example of an element within a wearable speech interface device which may provide information to an entity other than the wearer (e.g. to another wearable speech interface device). Further examples of such an element are shown in the third example 306, which shows a wearable speech interface device comprising one or more LEDs 307 and a small display 308. The LEDs 307 and/or display 308 may be used to provide information to the wearer (e.g. status information such as to confirm that the wearable speech interface device is on and performing continuous audio processing) and/or information to other people. The information provided to the wearer via the LEDs/display may also relate to applications running on the host device and may be used to provide notifications to the user over a longer period of time (e.g. change color to indicate local traffic conditions) and/or to provide notifications when the host device/wearable speech interface device determines (based on the context information) that audible alerts are not appropriate (e.g. when the user is in the middle of a conversation).

Where the LEDs/display are used to provide information to other people, this information may be status information relating to the user (e.g. green=available, red=unavailable), advertising (e.g. a logo or other commercial information) or any other information. Where the wearable speech interface device is used for advertising purposes, the wearer may receive a financial (or other) reward and the advertising may be linked to the context information or to user preferences (e.g. brands the user has indicated that they like in a social networking application). When considering a matrix of notification types (e.g. audible/visual) and targets (e.g. wearer/others), a wearable speech interface device may be configured in different ways to provide notifications. Two examples are provided below with the first example showing a wearable speech interface device which is only used to provide personal alerts for the wearer and the second example showing a wearable speech interface device which additionally provides some alerts to others:

|        | Audible alert | Visual alert |
|--------|---------------|--------------|
| Wearer | X             | X            |
| Others |               |              |
| Wearer |               | X            |
| Others | X             |              |

The fourth example 310 comprises another context sensor 312 which is arranged to detect whether the wearable speech interface device is attached to the user's clothing or not (i.e. whether it is being worn or not). In the example shown, the sensor 312 detects proximity of the opposing piece 313 of the spring clip which provides the attachment mechanism (the wearable speech interface device comprise two parts connected by a pivot 314 and is shown from the side in FIG. 3). Using proximity detection, the sensor 312 is arranged to detect whether there is something between the two parts (e.g. clothing 316 or another object). Such a sensor 312 (or sensor arrangement) may be used to provide a further power control technique by switching on the continuous audio processing when the wearable speech interface device is attached to something and switching it off when the wearable speech interface device is not attached to anything. It will be appreciated that other sensors may be used to detect whether the wearable speech interface device is being worn (i.e. sensors which are not closely coupled to the actual attachment mechanism) and one example is a temperature sensor arranged to detect a wearer's body heat.

Figure 4:
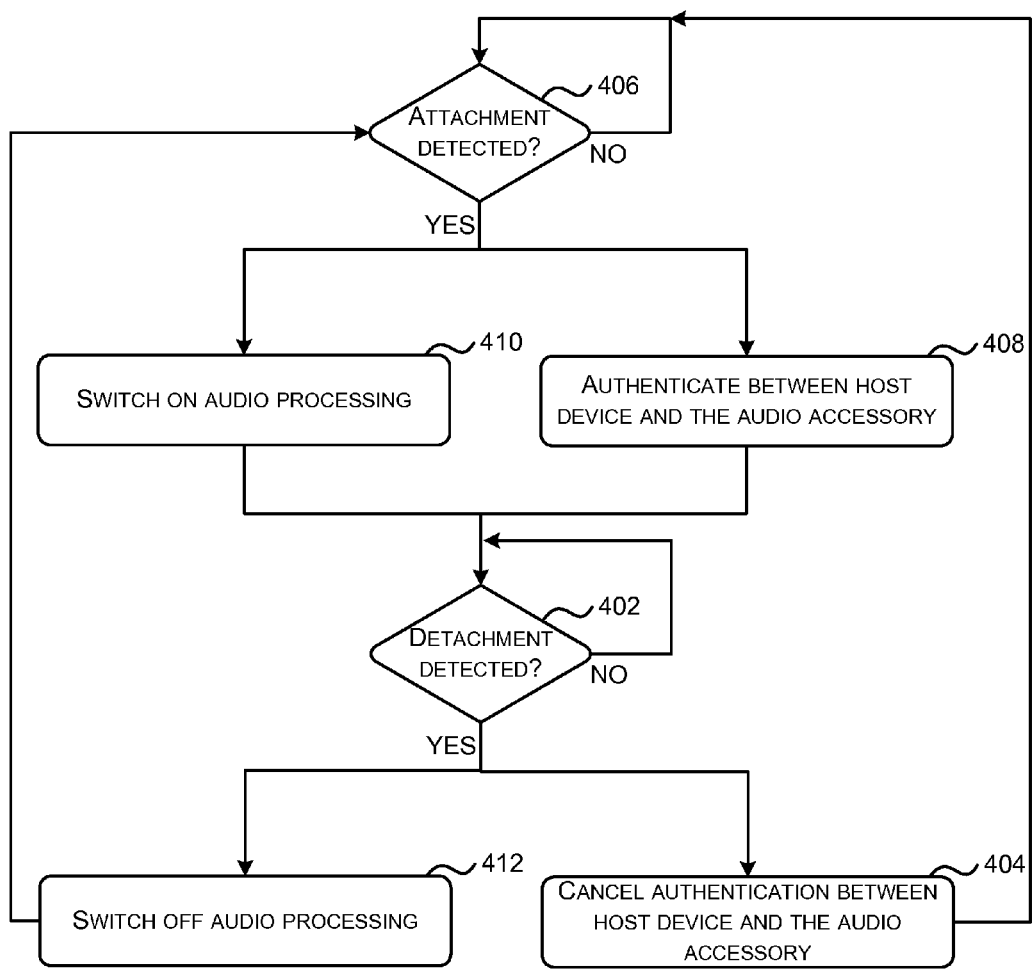
FIG. 4 is a flow diagram of an example method of operation of an audio accessory such as those shown in FIGS. 1 and 3.

A sensor which is arranged to detect attachment may also be used to provide a security mechanism as shown in FIG. 4. When the wearable speech interface device detects detachment, e.g. from a lapel or other piece of the user's clothes (in block 402), this may indicate that it has fallen off or been stolen. In response to this detection (in block 402), the authentication between the wearable speech interface device and the host device is cancelled (block 404) which results in the communication link (link 101 in FIG. 1) being lost. Subsequently if the wearable speech interface device is re-attached to the user's clothing or another person's clothing (as detected in block 406), re-authentication is required (in block 408). In addition (or instead), the audio processing system may be switched on (in block 410) and off (in block 412) as described above.

The fifth example 318 in FIG. 3 is arranged to be worn around the neck (e.g. underneath or on top of the collar) and comprises a neck band 319 which goes around the back of the user's neck. At each end of the band 319 is a wider portion which on one end comprises two loudspeakers 320 and on the other end comprises a microphone 322.

The sixth example 324 in FIG. 3 comprises a circular portion 326 and a flexible narrow band 328 which can be wrapped around the circular portion 326 when not in use to provide a compact device. A clip may be provided on the distal end 330 of the band 328 to affix the wearable speech interface device to a user's clothing (e.g. to their collar). The loudspeakers 332 are located on the band and in some examples may be arranged to also be usable as ear buds. The microphone 334 may be located in the circular portion 326 along with one or more controls 336 and a camera 338.

In further examples, a wearable speech interface device may comprise a connection element arranged to physically connect the wearable speech interface device to the host device for transport, charging and/or updating (e.g. to re-flash the firmware or speech models). In some examples, a two-fold charging arrangement may be provided which provides a slow charge for a lithium ion battery and a quick burst of charge for a supercapacitor (e.g. to enable the user to make one call or perform a small number of microtasks).

Figure 5:
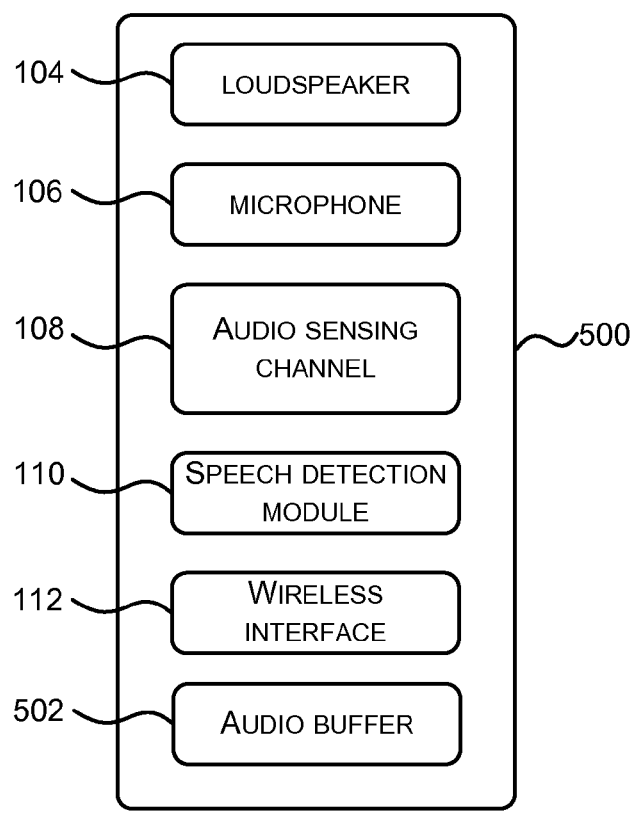
FIG. 5 is a schematic diagram of a further example audio accessory.
Figure 6:
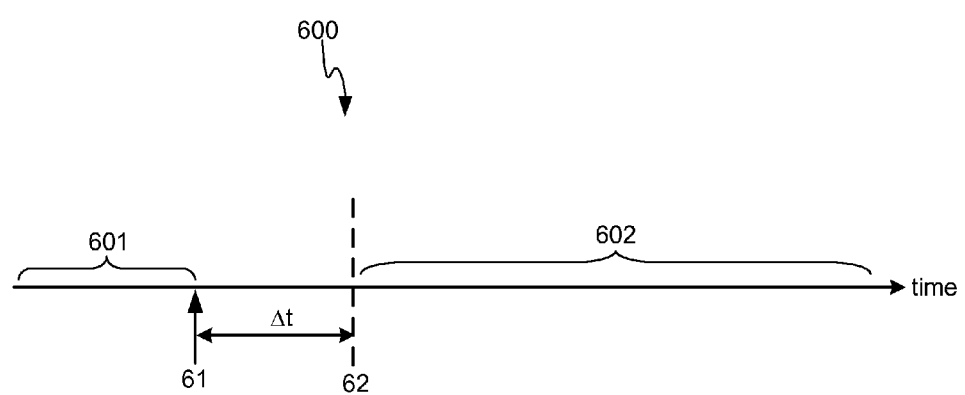
FIG. 6 shows an example timeline for a method of operation of an audio accessory such as the one shown in FIG. 5.

FIG. 5 is a schematic diagram of another wearable speech interface device 500 which comprises the features 104-112 shown in FIG. 1 and an additional element: an audio buffer 502. This audio buffer 502 is arranged to provide a rolling buffer to accommodate any latency in activating keyword detection (in block 204 of FIG. 2). The audio buffer 502 continuously stores the audio such that at any time the buffer contains the previous X seconds of audio as captured by the loudspeaker 104, where X is implementation dependent (e.g. X=2). In operation, as shown in the example timeline 600 in FIG. 6, the audio processing system initially operates at the lowest level of processing (audio level detection phase 601). Following a trigger (arrow 61), the audio processing system switches to the next level (keyword detection phase 602); however there may be a short delay, $\Delta t$, whilst the keyword detection module (which may be in the wearable speech interface device or the host device) is activated. During this delay, the detected audio is stored in the audio buffer 502 and once active, the keyword detection module does not process the audio as it is received from the loudspeaker but instead accesses the audio from the audio buffer 502 and operates on continuous audio which is delayed by the time $\Delta t$ (i.e. at any time T, the keyword detection module is processing audio which was stored in the audio buffer 502 at time T−$\Delta t$). As long as the size of the audio buffer (e.g. the value of X) is large enough to accommodate a rolling recording (i.e. a recording loop) of length that equals or exceeds $\Delta t$ the audio processing system will not miss a keyword that occurs in the audio in the period between the trigger (arrow 61) and the activation of keyword detection (dotted line 62).

In some examples, the audio buffer 502 may also be used to accommodate any latency in activating the natural language speech detection (in block 206 of FIG. 2). In such an example, the audio buffer may be sized to accommodate the larger of the two latencies (i.e. the larger of the latency in moving from block 202 to block 204 and the latency in moving from block 204 to block 206 in FIG. 2).

In addition, or instead, the audio buffer 502 may be used to accommodate any latency in performing the keyword detection. For example, although the audio is processed in real-time, an indication that a keyword has been detected may be issued a short time, $\Delta t$ (e.g. 2 seconds), after the keyword was spoken. By using the audio buffer 502 as a rolling buffer, all the audio detected after the keyword is still available for processing by a higher level in the audio processing hierarchy despite the latency in the trigger to move to a higher level within the audio processing hierarchy (e.g. the trigger to start natural language speech detection). In such an example, the higher layer in the hierarchy, at any time T is processing audio which was stored in the audio buffer 502 at time T−$\Delta t$.

Figure 7:
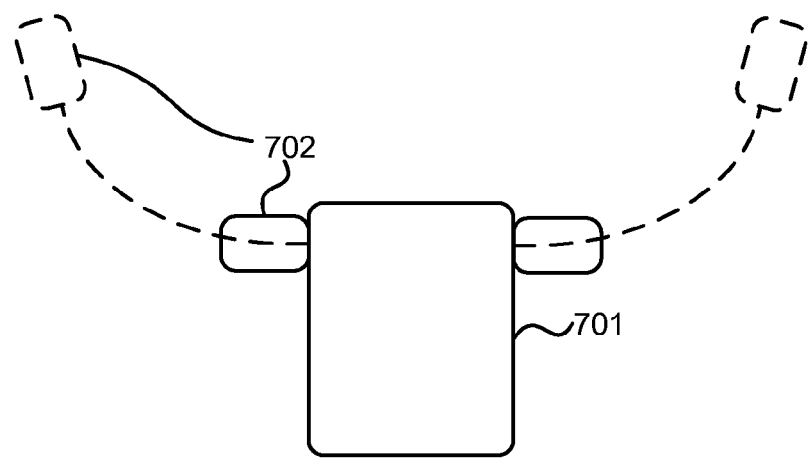
FIG. 7 shows schematic diagrams of two additional example audio accessories.
Figure 7:
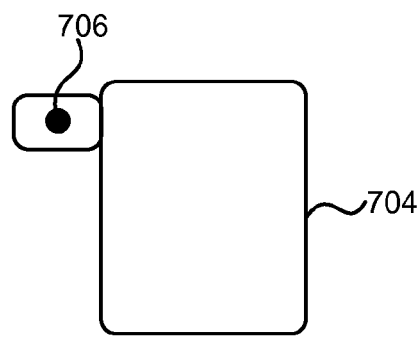

As described previously, many aspects of the wearable speech interface device may be optimized for performance of microtasks. In some examples, however, the wearable speech interface device has two modes of operation, a first mode for intermittent use (i.e. for the microtasks) and a second mode for making phone calls, listening to music or other extended tasks. In the second mode of operation, a more discrete audio channel may be used, e.g. by using integrated ear buds within the wearable speech interface device rather than the loudspeaker 104 or using an arrangement to conduct audio to the inner ear via the bones of the user's skull, or by rearranging/relocating the wearable speech interface device such that the loudspeaker can be placed in or close to the user's ear canal. Two example wearable speech interface devices are shown in FIG. 7, with the first 701 comprising ear buds 702 connected by wires that retract into the wearable speech interface device (with the dotted lines showing them in an extended position) and the second 704 comprising a protruding loudspeaker 706 which may be inserted into the ear canal for the second mode of operation. In each of these examples, the wearable speech interface device comprises a housing for the loudspeaker 104 which enables it to be placed into the user's ear canal when operating in the second mode of operation (i.e. for extended tasks). When in the second mode of operation, the notifications and audio processing hierarchy may be deactivated or this deactivation may be context dependent (e.g. deactivated when a user is on a phone call, but activated when the user is listening to music or once the call ends).

Figure 8:
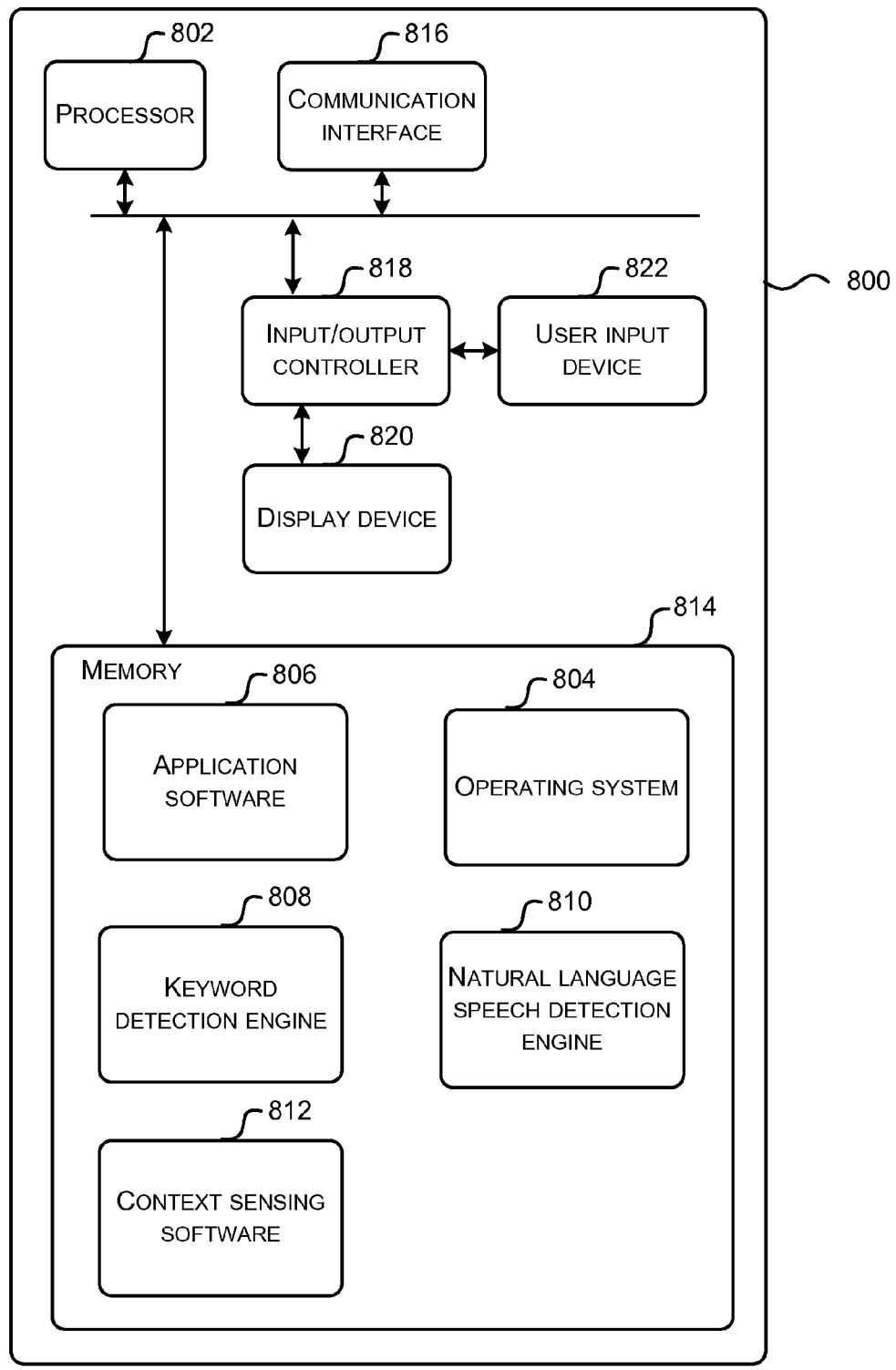
FIG. 8 illustrates various components of an exemplary computing-based device which may operate as a host device for an audio accessory such as those shown in FIGS. 1, 3, 5 and 7.

FIG. 8 illustrates various components of an exemplary computing-based device 800 which may be implemented as any form of a computing and/or electronic device, and which may operate as a host device for a wearable speech interface device.

Computing-based device 800 comprises one or more processors 802 which may be microprocessors, controllers or any other suitable type of processors for processing computer executable instructions to control the operation of the device in order to perform device initiated actions, respond to user initiated actions and perform audio processing. In some examples, for example where a system on a chip architecture is used, the processors 802 may include one or more fixed function blocks (also referred to as accelerators) which implement, for example, a part of the method of audio processing in hardware (rather than software or firmware). Platform software comprising an operating system 804 or any other suitable platform software may be provided at the computing-based device to enable application software 806-812 to be executed on the device. The application software may comprise audio processing software (e.g. a keyword detection engine 808 and/or a natural language speech detection engine 810) and context sensing software 812.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs).

The computer executable instructions may be provided using any computer-readable media that is accessible by computing based device 800. Computer-readable media may include, for example, computer storage media such as memory 814 and communications media. Computer storage media, such as memory 814, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 814) is shown within the computing-based device 800 it will be appreciated that the storage may be distributed or located remotely and accessed via a network or other communication link (e.g. using communication interface 816).

The communication interface 816 is arranged to provide a wireless communication link (e.g. link 101 in FIG. 1) between the computing-based device 800 and a wearable speech interface device. The computing-based device 800 also comprises an input/output controller 818 arranged to output display information to a display device 820 which may be separate from or integral to the computing-based device 800. The display information may provide a graphical user interface. The input/output controller 818 may also be arranged to receive and process input from one or more devices, such as a user input device 822 (e.g. a mouse, keyboard, camera, microphone or other sensor). In some examples the user input device 822 may detect voice input, user gestures or other user actions and may provide a natural user interface (NUI). This user input may be used to interact with applications running on the computing-based device 800 and in some examples may be used to authenticate the wearable speech interface device device. In an embodiment the display device 820 may also act as the user input device 822 if it is a touch sensitive display device. The input/output controller 818 may also output data to devices other than the display device, e.g. a locally connected printing device (not shown in FIG. 8).

Any of the input/output controller 818, display device 820 and the user input device 822 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, RGB camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

In some examples, the wearable speech interface device may act as an additional user input device for the computing-based device 800. As described above, the wearable speech interface device provides a speech-based interface between the user and the host device and so may be used as a microphone and speaker for applications (e.g. games) running on the computing-based device 800 in addition to being used for microtasks as described above. In some examples, a wearable speech interface device may have a communication link (e.g. link 101 in FIG. 1) to multiple computing-based devices, each acting as a host device, or alternatively the wearable speech interface device may select a single host device at any one time. This selection may be performed automatically by the wearable speech interface device or may involve user input (e.g. via a control 302 and where the display 308 may provide information on which nearby device is currently configured as the host device).

Figure 9:
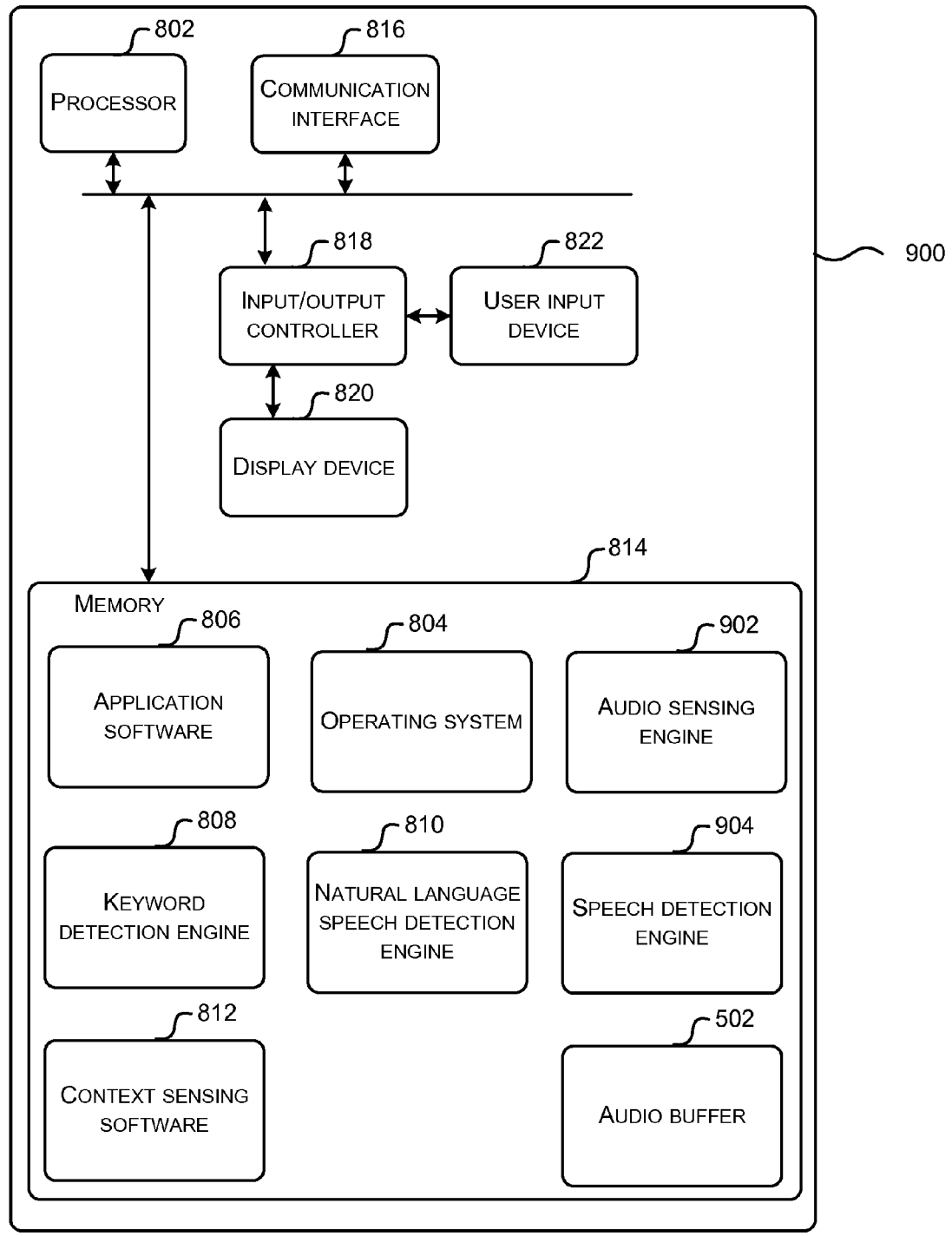
FIG. 9 illustrates various components of an exemplary computing-based device which integrates the audio accessory functionality.

Although in the examples described above, the wearable speech interface device is a separate physical device from the host device, in further examples, the wearable speech interface device functionality may be integrated within the same physical housing as the host device (e.g. as a functionally separate device or as fully integrated functionality). FIG. 9 illustrates various components of an exemplary computing-based device 900 which may be implemented as any form of a computing and/or electronic device, and which integrates the wearable speech interface device functionality. As shown in FIG. 9, the device 900 comprises the features described above with reference to FIG. 8 and in addition comprises a loudspeaker 104 and microphone 106. The application software further comprises an audio sensing engine 902 and a speech detection engine 904 which implement the functionality of the audio sensing channel 108 and speech detection module 110 (as described above with reference to FIG. 1). The memory 814 additionally provides an audio buffer 502 (as described above with reference to FIG. 5).

Figure 10:
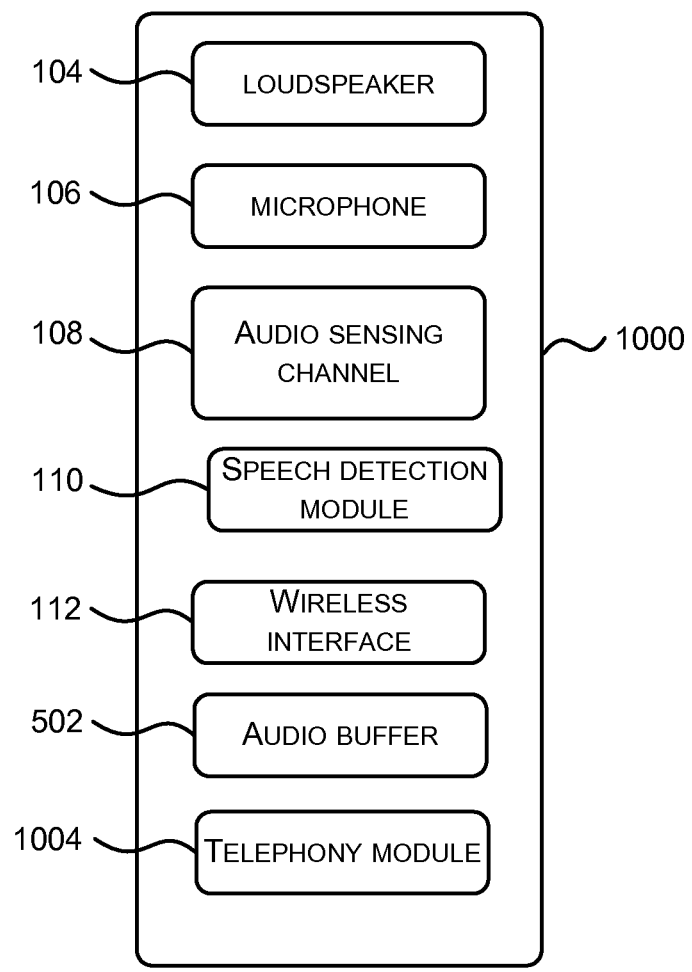
FIG. 10 shows a schematic diagram of another example audio accessory. Like reference numerals are used to designate like parts in the accompanying drawings.

In examples where the host device is a smartphone or otherwise provides telephony, the devices 800, 900 this functionality may be provided by the operating system 804 or by additional application software. FIG. 10 shows a schematic diagram of another example wearable speech interface device 1000 which comprises the audio sensing channel 108 and speech detection module 110 (as in the examples of FIGS. 1 and 5) and additionally comprises a telephony module 1004. In this example, the wearable speech interface device 1002 may use the communication interface 112 to communicate directly with a cellular base station to provide the telephony service to the user or alternatively the telephony module 1004 may use VoIP and connect to a network via the host device (e.g. host device 800 as shown in FIG. 8 and via the communication interfaces 112, 816). In further examples, the functionality may be split between the host device and the wearable speech interface device in a different way.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A wearable, hands-free, head-free audio accessory for a host computing device, the audio accessory comprising:
    a directional loudspeaker and a directional microphone which together are arranged to provide a speech based interface between a user and the host computing device for both user-initiated microtasks and host computing device initiated microtasks and wherein the directional loudspeaker is operative to provide notifications for the host computing device initiated microtasks;
    an always-on audio sensing channel and a speech detection module arranged to work together to continuously monitor an audio signal detected by the directional microphone and to trigger a first higher level of audio processing based on a detected level of the audio signal and to trigger a second higher level of audio processing based on detection of a predefined keyword;
    the always-on audio sensing channel and the speech detection module being further arranged to work together to control notifications to the user based at least in part on a determination that the user is having a conversation;
    a wireless interface arranged to provide a communication link between the audio accessory and the host computing device;
    an attachment mechanism arranged to attach the accessory to an item of clothing worn by the user; and
    a sensor arrangement arranged to detect whether the accessory is attached to an object.

2. A wearable, hands-free, head-free audio accessory according to claim 1, further comprising:
    a power control mechanism arranged to control operation of the always-on audio sensing channel based on the output of the sensor arrangement.

3. A wearable, hands-free audio accessory according to claim 1, wherein the sensor arrangement is further arranged to trigger a requirement for re-authentication between the audio accessory and the host computing device following detection of detachment of the audio accessory from the object.

4. A wearable, hands-free audio accessory according to claim 1, further comprising an audio buffer arranged to provide a recording loop for the audio signal detected via the microphone to accommodate any latency associated with keyword detection.

5. A wearable, hands-free audio accessory according to claim 1, wherein the speech based interface comprises an audio processing hierarchy comprising at least three levels.

6. A wearable, hands-free audio accessory according to claim 1, wherein the wearable, hands-free audio accessory is arranged to output a delayed audio signal to a speech detection module located in the host device via the wireless interface.

7. A wearable, hands-free audio accessory according to claim 1, wherein the audio accessory comprises two modes of operation, a first mode for performing microtasks and a second mode for extended tasks.

8. A wearable, hands-free audio accessory according to claim 1, wherein the speech based interface is arranged to provide audible notifications to the user and wherein a notification is triggered by software running on the host computing device.

9. A wearable, hands-free audio accessory according to claim 8, further comprising a physical control and wherein a user input received via the physical control is arranged to trigger provision of additional information relating to a notification to the user via the speech based interface or to initiate a speech-based interaction.

10. A wearable, hands-free audio accessory according to claim 1, wherein the speech detection module is at least partially implemented using hardware logic selected from any one or more of: a field-programmable gate array, a program-specific integrated circuit, a program-specific standard product, a system-on-a-chip, and a complex programmable logic device.

11. A method of controlling operation of wearable, hands-free, head-free audio accessory for a host computing device, the method comprising:
arranging a directional loudspeaker and a directional microphone to provide a speech based interface between a user and the host computing device for both user-initiated microtasks and host computing device initiated microtasks and wherein the directional loudspeaker is operative for providing notifications for the host computing device initiated microtasks;
arranging an always-on audio sensing channel and a speech detection module to continuously monitor an audio signal detected by the directional microphone and to trigger a first higher level of audio processing based on a detected level of the audio signal and to trigger a second higher level of audio processing based on detection of a predefined keyword;
arranging the always-on audio sensing channel and the speech detection module to control notifications to the user based at least in part on a determination that the user is having a conversation;
providing, via a wireless interface, a communication link between the audio accessory and the host computing device; and
detecting, via a sensor arrangement, whether the accessory is attached to an object, the accessory being arranged to attach to an item of clothing worn by the user.

12. A method according to claim 11, further comprising:
canceling authentication between the host computing device and the audio accessory in response to detecting detachment of the audio accessory from an object.

13. A method according to claim 11, further comprising:
providing a signal from a microphone or other sensor in the audio accessory to context sensing software in the host computing device via the wireless interface in the audio accessory.

14. A method according to claim 11, further comprising:
storing, in an audio buffer providing a recording loop, an audio signal detected via the microphone in the audio accessory; and
outputting a delayed audio signal to audio processing elements in the audio accessory or the host computing device.

15. A method according to claim 11, further comprising:
determining whether to provide an alert based on a pre-determined length of time without any speech detected by the speech detection module;
determining whether to delay the alert based on whether the alert is appropriate;
determining a type of the alert to provide based on whether the alert is delayed; and
displaying status information on a wireless interface, the wireless interface including a display and light emitting diodes (LEDs).

16. A method according to claim 11, further comprising controlling operation of the always-on audio sensing channel based on output of the sensor arrangement.

17. A method according to claim 11, further comprising triggering a requirement for re-authentication between the audio accessory and the host computing device following detection of detachment of the audio accessory from the object.

18. A method according to claim 11, further comprising providing a recording loop for the audio signal detected via the microphone to accommodate any latency associated with keyword detection.

19. A method according to claim 11, wherein the speech based interface comprises an audio processing hierarchy comprising at least three levels.

20. A method according to claim 11, further comprising initiating a speech-based interaction in response to a user input received via a physical control.

* * * * *